United States Patent [19]
Ozechowski

[11] Patent Number: 6,155,390
[45] Date of Patent: Dec. 5, 2000

[54] INCREMENTAL BRAKING INTERFACE BETWEEN SHOE AND DRUM OR CALIPER AND ROTOR AND METHOD OF BRAKING

[75] Inventor: Russell Ozechowski, P.O. Box 4295, Bethlehem, Pa. 18018-0295

[73] Assignee: Russell Ozechowski, Center Valley, Pa.

[21] Appl. No.: 09/090,394

[22] Filed: Jun. 4, 1998

[51] Int. Cl.[7] .................................................. F16D 69/00
[52] U.S. Cl. ...................... 188/259; 188/250 R; 188/382
[58] Field of Search .................... 188/336, 72.5, 188/250 R, 250 B, 250 E, 259, 250 G, 244, 382

[56] References Cited

U.S. PATENT DOCUMENTS

| | | | |
|---|---|---|---|
| 1,462,391 | 7/1923 | Stokes | 188/250 B |
| 3,840,093 | 10/1974 | Hamayasu | 188/250 B |
| 3,868,002 | 2/1975 | Babled | 188/250 B |
| 5,503,257 | 4/1996 | Sugita et al. | 188/251 R |
| 5,819,880 | 10/1998 | Ota et al. | 188/252 G |

FOREIGN PATENT DOCUMENTS

| | | | |
|---|---|---|---|
| 813627 | 2/1936 | France | 188/250 G |
| 1034445 | 3/1951 | France | 188/250 B |

*Primary Examiner*—Christopher P. Schwartz
*Assistant Examiner*—Devon Kramer
*Attorney, Agent, or Firm*—Ronald P. Kananen; Rader, Fishman & Grauer

[57] ABSTRACT

An incremental braking method and system in which a braked member which is in motion, e.g., a brake drum, is engaged by a series of flexible stops on a braking member, e.g., a brake shoe, to brake the braked member. A rigid stop on the braked member sweeps past the flexible stops on the braking member to cause vibrations. The vibrations are damped as the flexible stops engage the braked member, thereby inhibiting the motion of the braked member. The flexible stops are of unequal lengths and are provided on springs which allow them to retract into the braking member. In this way, the stops incrementally engage the braked member for smoother and more efficient braking.

16 Claims, 3 Drawing Sheets

INCREMENTAL BRAKING INTERFACE BETWEEN SHOE AND DRUM OR CALIPER AND ROTOR AND METHOD OF BRAKING

FIELD OF THE INVENTION

The present invention relates to the field of brakes. More specifically, the present invention relates to a method for braking and a novel braking interface between brake shoes and drum, or between a brake caliper and rotor, to incrementally apply braking force so as to provide more even and effective braking than previously available.

BACKGROUND OF THE INVENTION

Brakes are used in a much wider variety of applications than is commonly recognized. The most obvious example of brakes is found in the common automobile. Typically, all the wheels in an automobile, whether car, truck or industrial vehicle, incorporate a braking mechanism to slow or stop the vehicle when moving. Similarly, bicycles are another common example of devices that utilize braking mechanisms.

Additionally, however, brakes may be used in many other types of machinery which have moving parts that must periodically be slowed or stopped. For example, elevators must employ brakes to regulate the travel of the elevator. Some electric generators or motors use brakes to regulate revolutions.

While modern braking technology continues to advance, many problems remain. For example, brakes by their nature are subject to extreme wear and tear. In automobiles, the demands placed on the brakes when the automobile is turning are unequal. The brakes on the wheels inside of the turn need to exert less force than the brakes on the wheels on the outside of the turn. These unbalanced forces prevent braking from being as smooth and even as it otherwise would be. Moreover, the wear on the braking mechanisms is increased.

Accordingly, there is a need in the art for a method of braking and a braking mechanism that can more evenly distribute the braking force. There is a need in the art for a brake interface that incrementally applies braking force as it is needed.

SUMMARY OF THE INVENTION

It is an object of the present invention to meet the above-described needs and others. Specifically, it is an object of the present invention to provide a method of braking and a braking mechanism that can more evenly distribute braking force. More specifically, it is an object of the present invention to provide a brake interface and method of braking that incrementally applies braking force as it is needed.

Additional objects, advantages and novel features of the invention will be set forth in the description which follows or may be learned by those skilled in the art through reading these materials or practicing the invention. The objects and advantages of the invention may be achieved through the means recited in the attached claims.

To achieve the stated and other objects, the present invention may be embodied as a braking system which includes a first rotating member; a second member which engages the first member to inhibit movement of the first member; and a plurality of flexible stops provided on the second member for engaging the first member. Preferably, the flexible stops are aligned in at least one row which runs along the width of the second member perpendicular to the movement of the first member.

Preferably, a rigid stop provided on the first member passes under the flexible stops when the first and second members are engaged, causing vibrations in the flexible stops. The vibrating flexible stops are forced against the first member whereby the first member damps the vibrations and is braked.

Preferably, at least some of the flexible stops are of unequal lengths such that the flexible stops engage the first member incrementally when the second member is forced toward the first member. A spring associated with each flexible stop allows the flexible stop to retract a given distance into the second member when the second member is forced toward the first member, thereby allowing flexible stops of shorter length to incrementally engage the first member.

The present invention may be applied to any braking system for example, the first member may be a brake drum and the second member a brake shoe. Alternatively, the first member may be a brake disc and the second member a brake caliper.

The present invention also encompasses a method of braking by engaging a first rotating member with a plurality of flexible stops provided on a second member which is forced toward the first member to inhibit movement of the first member.

The method of the present invention continues by sweeping a rigid stop on the first member across the flexible stops to cause vibrations in the flexible members; and forcing the vibrating flexible stops against the first member whereby the first member damps the vibrations and is braked.

Preferably, the method includes providing at least some of the flexible stops with unequal lengths such that the flexible stops engage the first member incrementally when the second member is forced toward the first member; and retracting at least one of the flexible stops into the second member a given distance by compressing a spring associated with each flexible stop when the second member is forced toward the first member, thereby allowing flexible stops of shorter length to incrementally engage the first member.

BRIEF DESCRIPTION OF THE DRAWINGS

The accompanying drawings illustrate the present invention and are a part of the specification. Together with the following description, the drawings demonstrate and explain the principles of the present invention.

DETAILED DESCRIPTION OF THE PREFERRED EMBODIMENTS

Using the drawings, the preferred embodiments of the present invention will now be explained. The principles of the present invention may be applied to any type of brake. The following examples are particular applications of the present invention. However, the invention is not limited to these examples.

Figure 1:
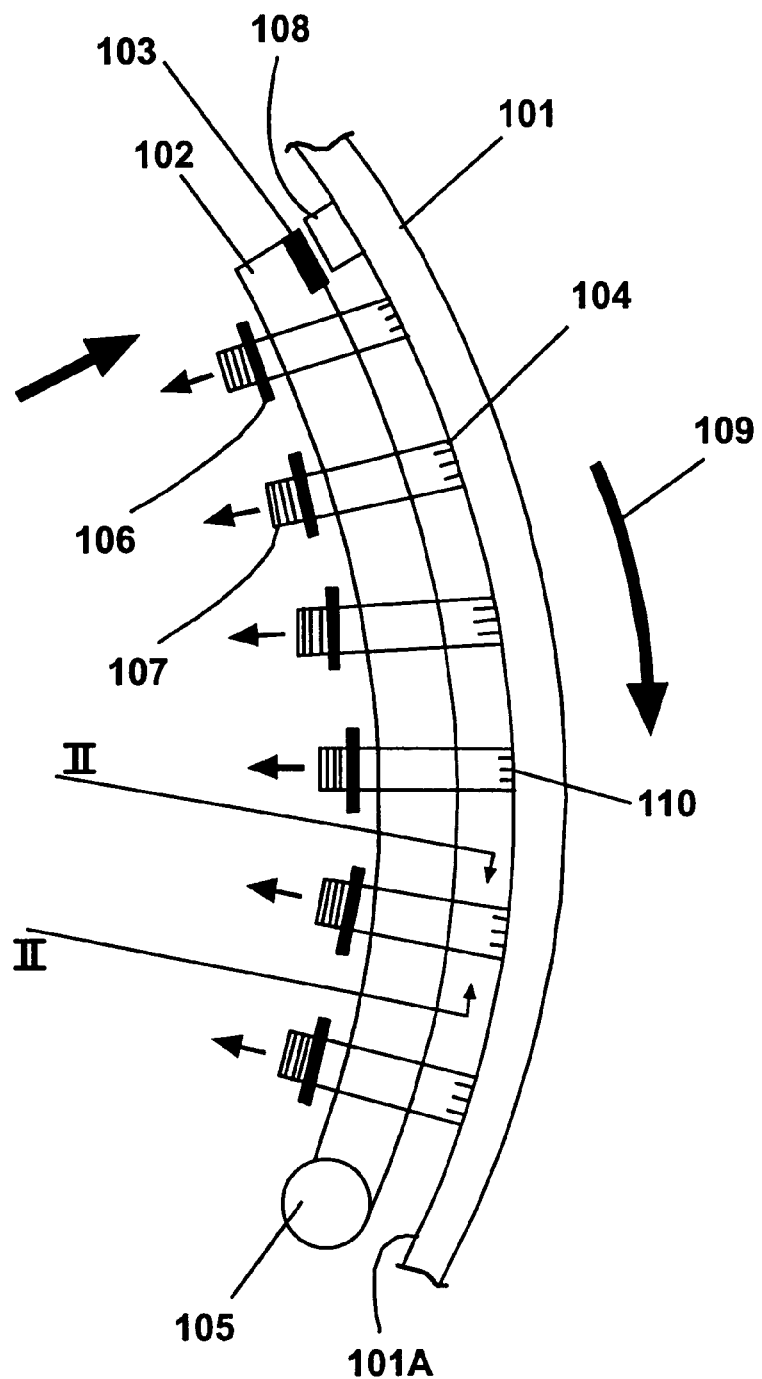
FIG. 1 is an illustration of an example of the present invention as applied to a brake shoe and brake drum arrangement.

In general, under the principles of the invention, a series of rows of flexible stops are provided on one of the two members which are pressed together to effect braking. FIG. 1 illustrates this principle as applied to a brake shoe and drum arrangement. As shown in FIG. 1, a brake shoe 102 moves around pivot 105 to come into contact with a brake drum 101.

In the past, the interface between shoe and drum has been a brake pad made of extremely hard, heat-resistant material. However, under the principles of the present invention, the interface between the shoe 102 and the brake drum 101 is primarily a series of rows of flexible stops 104 which extend radially outward from the shoe 102. A friction pad 103 may also be provided on the shoe 102 to contact the drum 101. As will be appreciated by those skilled in the art, the flexible stops could be provided on the drum 101 and contact the shoe 102 without altering the principles of the present invention. This is true for all examples of the present invention.

The flexible stops 104 are tabs which are arranged in a series of rows along the shoe 102. The rows of stops 104 run perpendicular to the arc 109 through which the drum 101 moves. When the shoe 102 is rotated about the pivot 105 the stops engage the surface 101A of the drum 101. The flexible tabs are thin enough so that they can flex in either direction along the circumferential direction 109 of the brake drum 101. For example, the flexible tabs may be made from stainless steel.

Each flexible stop includes a spring 107 which allows the flexible stop 104 to retract into the brake shoe 102 a given distance. A spring stop 106 is provided to limit the retraction of the flexible stop 104 into the brake shoe 102.

Figure 2:
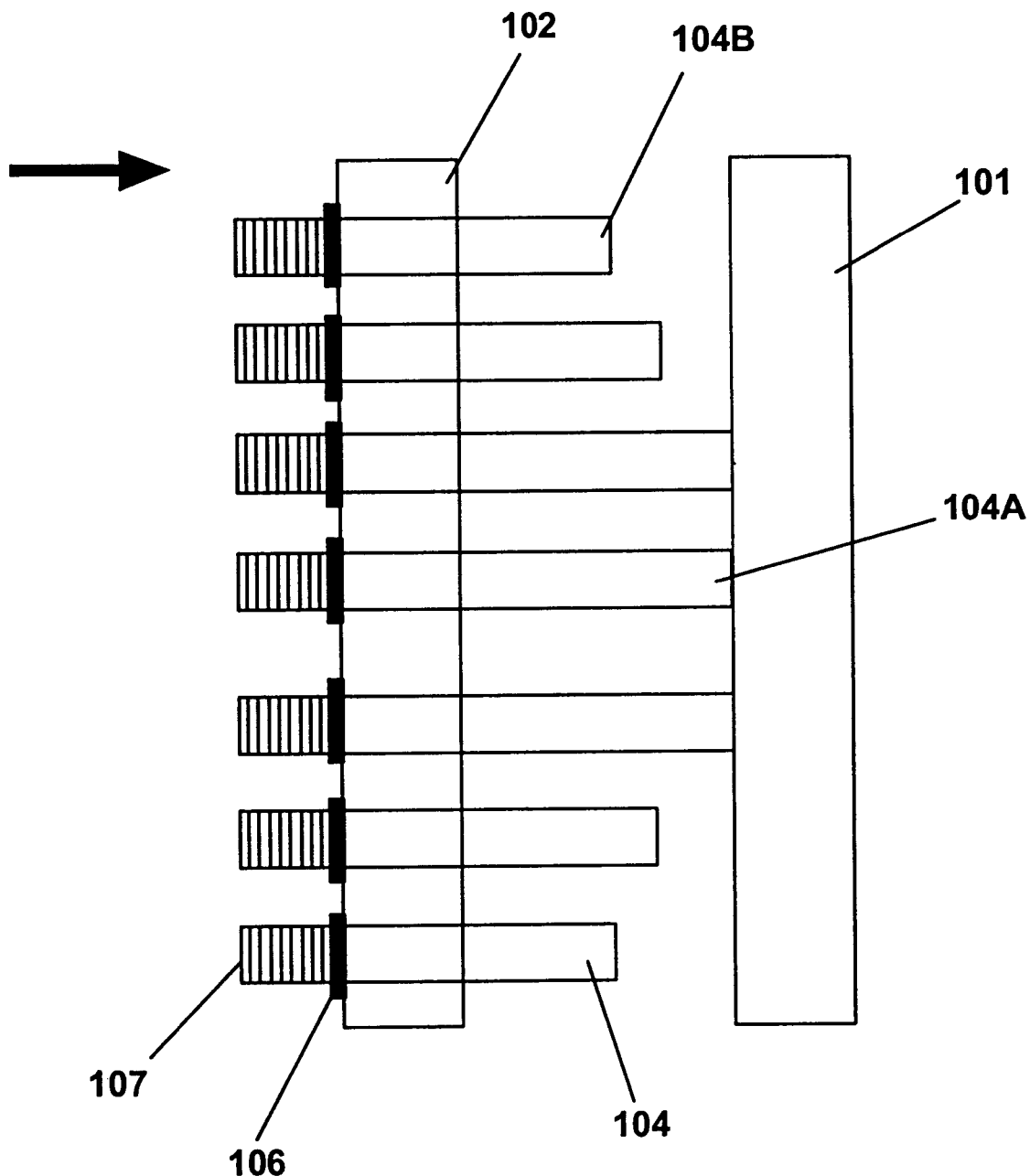
FIG. 2 is an illustration of the brake illustrated in FIG. 1 with the shoe slightly withdrawn from the drum.

FIG. 1 illustrates the brake shoe 102 and the flexible stops 104 engaged against the drum 101. FIG. 2 illustrates a row of the flexible stops 104 as viewed along the line II—II of FIG. 1. In FIG. 2, the shoe 102 is not fully engaged against the drum 101. As can be seen in FIG. 2, the flexible stops 104 along a particular row are not of equal length. Accordingly, some of the flexible stops, e.g. 104A, engage the brake drum 101 before the other flexible stops, e.g. 104B. This provides an incremental braking effect which is superior to the functioning of previous braking systems.

Additionally, as shown in FIGS. 1 and 2, the brake drum 101 includes one or more rigid stops 108 on the engagement surface 101A of the drum 101. These rigid stops 108 are elevated ridges provided across the width of the engagement surface 101A of the drum 101. As the rigid stop or stops 108 sweep under the flexible stops 104, it causes the flexible stops 104 to vibrate.

Obviously, the flexible stops 104 must have sufficient flexibility to permit passage of the rigid stop 108, and one or more slits 110 may be provided in the ends of the flexible stops 104 to soften the hit between the flexible stops 104 and the rigid stop 108. The slits 110 run along the ends of the flexible stops 104 parallel to the rigid stop 108. Thus, when the rigid stop 108 sweeps past the flexible stop 104, the end of the flexible stop 104 can deform inward into a slit 110 to more readily allow the rigid stop 108 to pass.

As noted, the passage of the rigid stop 108 causes the flexible stops 104 to vibrate. When the vibrating flexible stops 104 are engaged and pressed against the drum 101, the engagement surface 101A of the drum damps the vibration. This further increases the effectiveness of the braking system of the present invention.

Figure 3:
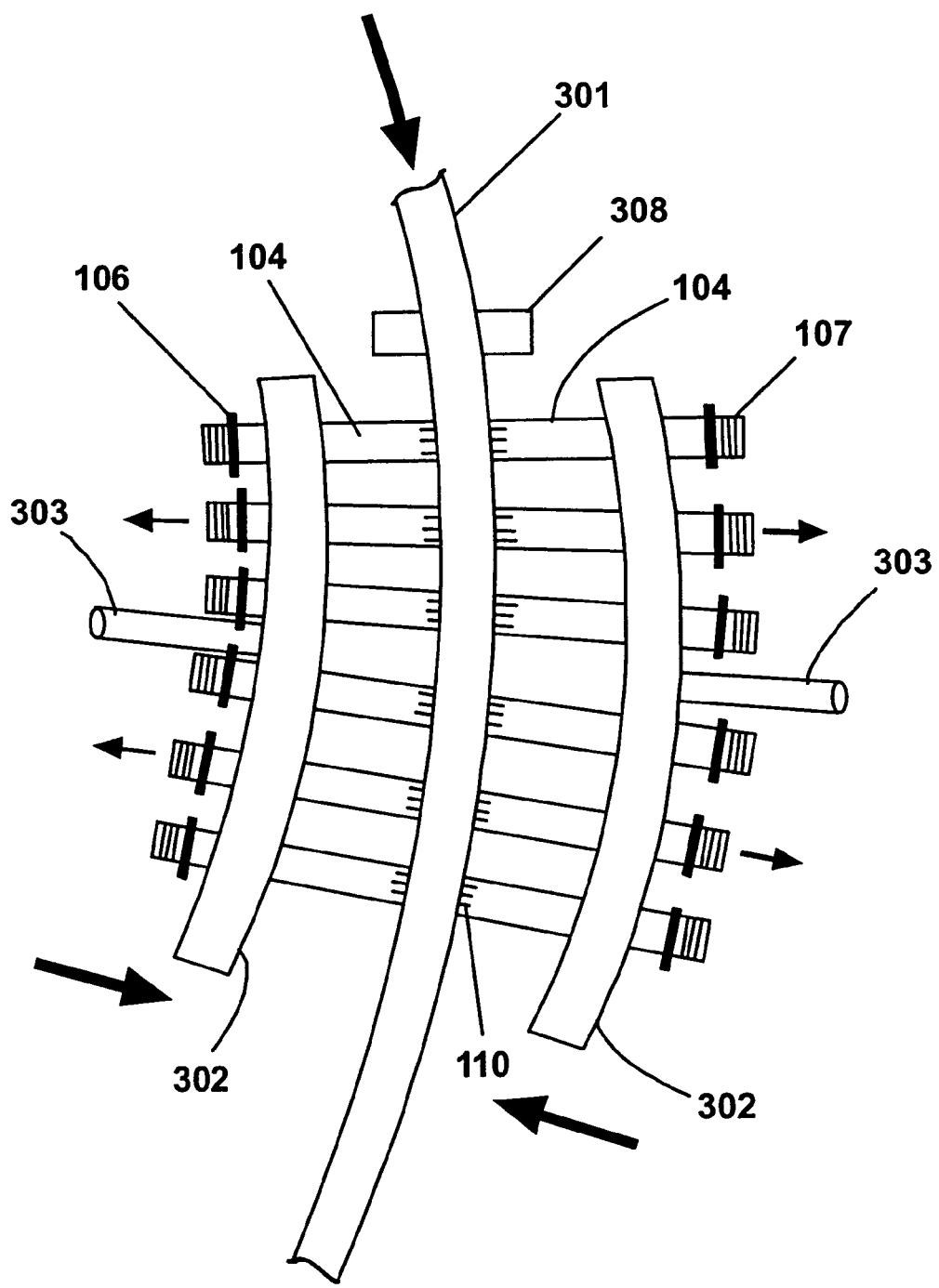
FIG. 3 is an illustration of the present invention as applied to a disc brake arrangement.

FIG. 3 illustrates the principles of the present invention applied to a disc brake system. Similar to the example provided above, the calipers 302 of the disc brake are forced against both sides of the disc or rotor 302 by the action of cylinders 303. Each caliper 302 has provided thereon flexible stops 104 which engage opposite sides of the disc 301 in the identical manner described previously.

The disc brake system also includes a rigid stop 308 which is provided on both sides of the disc 301. In this way, the movement of the disc 301 sweeps the rigid stop 308 under the flexible stops 104 on both prongs of the caliper 302. Slits 110 may also be provided in the ends of the flexible stops 104 in this embodiment.

With regard to a vehicle, the described braking system provides a more balanced braking effect because the vibration of the flexible stops 104 which is damped, e.g., by the drum 101 or disc 301, is dependent on the speed of the drum 101 or disc 301. Thus, the drum or disc on the wheels outside a turn will be turning faster, causing greater vibration and generating a stronger braking effect as needed than is created for the wheels inside a turn.

Moreover, the braking system of the present invention eliminates the problem of brake dust common to conventional braking systems. Additionally, the incremental nature of the braking system of the present invention eliminates the need for automatic braking systems which take a much more complicated approach to control braking force.

Finally, the braking system of the present invention increases vehicle efficiency by preventing the drag back effect and pollution caused by the transmission brake effect (TBE).

The preceding description has been presented only to illustrate and describe the invention. It is not intended to be exhaustive or to limit the invention to any precise form disclosed. Many modifications and variations are possible in light of the above teaching.

The preferred embodiment was chosen and described in order to best explain the principles of the invention and its practical application. The preceding description is intended to enable others skilled in the art to best utilize the invention in various embodiments and with various modifications as are suited to the particular use contemplated. It is intended that the scope of the invention be defined by the following claims.

What is claimed is:

1. A braking system, comprising:
   a first rotating member;
   a second member which engages said first member to inhibit movement of said first member; and
   a plurality of flexible metal stops provided on said second member for engaging said first member, wherein said flexible stops are sufficiently flexible to bend along a length thereof.

2. A braking system as claimed in claim 1, wherein said flexible stops are arranged on said second member in at least one row, said at least one row being arranged across a width of said second member perpendicular to the movement of said first member.

3. A braking system as claimed in claim 1, wherein said first member is a brake disc and said second member is a brake caliper.

4. A braking system, comprising:
   a first rotating member;
   a second member which engages said first member to inhibit movement of said first member;
   a plurality of flexible stops provided on said second member for engaging said first member; and
   a rigid stop on said first member which passes said flexible stops when said first and second members are engaged causing vibrations in said flexible members.

5. A braking system as claimed in claim 4, wherein said vibrating flexible stops are forced against said first member whereby said first member damps said vibrations and is braked.

6. A braking system, comprising:

a first rotating member;

a second member which engages said first member to inhibit movement of said first member; and a plurality of flexible metal stops provided on said second member for engaging said first member;

wherein at least some of said flexible stops are of unequal lengths such that said flexible stops engage said first member incrementally when said second member is forced toward said first member.

7. A braking system, comprising:

a first rotating member;

a second member which engages said first member to inhibit movement of said first member;

a plurality of flexible stops provided on said second member for engaging said first member, wherein at least some of said flexible stops are of unequal lengths such that said flexible stops engage said first member incrementally when said second member is forced toward said first member; and a spring associated with each flexible stop so as to allow that flexible stop to retract a given distance into said second member when said second member is forced toward said first member, thereby allowing flexible stops of shorter length to incrementally engage said first member.

8. A braking system, comprising:

a first rotating member;

a second member which engages said first member to inhibit movement of said first member; and a plurality of flexible stops provided on said second member for engaging said first member;

wherein said first member is a brake drum and said second member is a brake shoe.

9. A method of braking, comprising engaging a first rotating member with a plurality of flexible metal stops provided on a second member which is forced toward said first member to inhibit movement of said first member, wherein said flexible stops are sufficiently flexible to bend along a length thereof.

10. A method as claimed in claim 9, wherein said flexible stops are arranged on said second member in at least one row, said at least one row being arranged across a width of said second member perpendicular to the movement of said first member.

11. A method as claimed in claim 9, wherein said first member is a brake disc and said second member is a brake caliper.

12. A method of braking, comprising:

engaging a first rotating member with a plurality of flexible stops provided on a second member which is forced toward said first member to inhibit movement of said first member; and sweeping a rigid stop on said first member past said flexible stops on said second member to cause vibrations in said flexible stops.

13. A method as claimed in claim 12, further comprising forcing said vibrating flexible stops against said first member whereby said first member damps said vibrations and is braked.

14. A method of braking, comprising:

engaging a first rotating member with a plurality of flexible metal stops provided on a second member which is forced toward said first member to inhibit movement of said first member; and providing at least some of said flexible stops with unequal lengths such that said flexible stops engage said first member incrementally when said second member is forced toward said first member.

15. A method of braking, comprising:

engaging a first rotating member with a plurality of flexible stops provided on a second member which is forced toward said first member to inhibit movement of said first member;

providing at least some of said flexible stops with unequal lengths such that said flexible stops engage said first member incrementally when said second member is forced toward said first member; and retracting at least one of said flexible stops into said second member a given distance by compressing a spring associated with each flexible stop when said second member is forced toward said first member, thereby allowing flexible stops of shorter length to incrementally engage said first member.

16. A method of braking, comprising engaging a first rotating member with a plurality of flexible stops provided on a second member which is forced toward said first member to inhibit movement of said first member, wherein said first member is a brake drum and said second member is a brake shoe.

* * * * *